(12) United States Patent
Nava Gonzalez

(10) Patent No.: US 10,605,360 B2
(45) Date of Patent: Mar. 31, 2020

(54) ACTUATOR WITH RELEASE AND RETURN MECHANISMS

(71) Applicant: Robert Bosch LLC, Broadview, IL (US)

(72) Inventor: Raul Nava Gonzalez, Toluca (MX)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 15/440,344

(22) Filed: Feb. 23, 2017

(65) Prior Publication Data

US 2018/0238445 A1    Aug. 23, 2018

(51) Int. Cl.
| | | |
|---|---|---|
| *F16H 61/32* | (2006.01) | |
| *F16H 1/16* | (2006.01) | |
| *F16H 63/34* | (2006.01) | |
| *F16H 61/12* | (2010.01) | |

(52) U.S. Cl.
CPC .............. *F16H 61/32* (2013.01); *F16H 1/16* (2013.01); *F16H 61/12* (2013.01); *F16H 63/3458* (2013.01); *F16H 63/3466* (2013.01); *F16H 63/3491* (2013.01); *F16H 2061/1232* (2013.01); *F16H 2061/1292* (2013.01); *F16H 2061/326* (2013.01)

(58) Field of Classification Search
CPC .. F16H 61/32; F16H 63/3491; F16H 63/3466; F16H 61/12; F16H 63/3458; F16H 1/16; F16H 2061/1292; F16H 2061/1232; F16H 2061/326
USPC ................................ 74/89.14, 473.12, 473.1
See application file for complete search history.

(56) References Cited

U.S. PATENT DOCUMENTS

| | | | | |
|---|---|---|---|---|
| 4,002,219 A | * | 1/1977 | Steinmann | B60R 22/44 297/475 |
| 4,938,088 A | * | 7/1990 | Langley | F16H 61/32 74/473.1 |
| 6,321,612 B1 | * | 11/2001 | Leimbach | F16H 61/28 74/473.12 |
| 6,481,556 B1 | | 11/2002 | Haupt | |
| 6,688,448 B2 | | 2/2004 | Giefer et al. | |
| 7,966,903 B2 | | 6/2011 | Kimura et al. | |
| 9,239,108 B2 | | 1/2016 | Ganter et al. | |

(Continued)

OTHER PUBLICATIONS

Extended European Search Report for EP application 18150795.5 dated Jul. 6, 2018.

*Primary Examiner* — Victor L MacArthur
(74) *Attorney, Agent, or Firm* — Kelly McGlashen; Maginot, Moore & Beck LLP

(57) ABSTRACT

An electronic transmission range select actuator (ETRSA) includes a primary drive system that operates during normal operation. The ETRSA includes an output shaft that is connected to the system via a lock pin during normal operation. The ETRSA also includes a release mechanism having a secondary motor that operates during a power loss or failure of the system. The secondary motor drives a gear that rotates freely relative to the output shaft. Rotation of the gear results in axial movement of the gear toward the lock pin, which in turn causes disengagement of the lock pin from the output shaft, allowing the output shaft to rotate due to the biasing load of a torsion spring such that the output shaft is returned to the P-range position. Thus, the mechanism is configured to return the output shaft to the P-range during a power loss or failure of the first motor.

21 Claims, 9 Drawing Sheets

(56) References Cited

U.S. PATENT DOCUMENTS

| | | | |
|---|---|---|---|
| 2003/0074998 A1* | 4/2003 | Esly | F16H 61/28 |
| | | | 74/473.12 |
| 2011/0126657 A1 | 6/2011 | Ganter et al. | |
| 2015/0143938 A1 | 5/2015 | Swaita et al. | |

* cited by examiner

ACTUATOR WITH RELEASE AND RETURN MECHANISMS

BACKGROUND

In some vehicles, gear position or range within the power train is shifted via a shift-by-wire or electronic transmission range selector. This device includes an actuator that shifts gears within the vehicle transmission and is controlled via a wired connection by a remote range selector operated by the vehicle user. Using the electronic transmission range selector, the vehicle user is able to change the transmission gear range between the several available gear ranges, including park, neutral, drive, reverse, etc. An electronic transmission range selector is advantageous compared to some conventional vehicle transmission range selectors that are controlled via a gear shift lever that is connected to the transmission via a mechanical linkage. For example, the electronic transmission range selector has a reduced space requirement within the vehicle compartment as compared to the conventional mechanical transmission range selector.

The actuator of the electronic transmission range selector may be an electric motor. In this case, it is important to be able to securely place the vehicle in the park transmission range in the event of an abnormality and/or failure occurs in the actuator power source (i.e., a vehicle battery), the electrical conductors that supply power to the actuator, or in the actuator itself.

SUMMARY

In some aspects, an actuation device includes an output shaft that is rotatable about a rotational axis, and a first gear train that connects a first actuator to the output shaft and transmits rotational output of the first actuator to the output shaft. The first gear train includes a driver that is driven by the first actuator to rotate about the rotational axis and is configured to be fixed relative to the output shaft via a pin. The actuation device also includes a second gear train that connects a second actuator to a release mechanism and transmits rotational output of the second actuator to the release mechanism. The release mechanism is moveable between a retracted position in which the pin is engaged with the output shaft such that the output shaft is fixed relative to the driver, and an advanced position in which the pin is disengaged from the output shaft and the output shaft is permitted to rotate relative to the driver. In some actuation device operating conditions, the output shaft is driven by the first actuator to rotate via the first gear train, and in other actuation device operating conditions, the release mechanism is driven by the second actuator to move from the retracted position to the advanced position, whereby the output shaft is disengaged from the first gear train.

In some aspects, a transmission system includes a vehicle transmission, an electronic transmission range selector that indicates a desired transmission range of the vehicle transmission, and an actuation device that adjusts the configuration of the vehicle transmission to correspond to the transmission range as indicated by the electronic transmission range selector. The actuation device includes an output shaft that is rotatable about a rotational axis, and a first gear train that connects a first actuator to the output shaft and transmits rotational output of the first actuator to the output shaft. The first gear train includes a driver that is driven by the first actuator to rotate about the rotational axis and is configured to be fixed relative to the output shaft via a pin. The actuation device also includes a second gear train that connects a second actuator to a release mechanism and transmits rotational output of the second actuator to the release mechanism. The release mechanism is moveable between a retracted position in which the pin is engaged with the output shaft such that the output shaft is fixed relative to the driver, and an advanced position in which the pin is disengaged from the output shaft and the output shaft is permitted to rotate relative to the driver. In some actuation device operating conditions, the output shaft is driven by the first actuator to rotate via the first gear train, and in other actuation device operating conditions, the release mechanism is driven by the second actuator to move from the retracted position to the advanced position, whereby the output shaft is disengaged from the first gear train.

The transmission system and the actuation device may include one or more of the following features: During the other actuation device operating conditions, the output shaft is urged to return to a predetermined rotational position under the biasing force of an elastic member. The elastic element is a torsion spring, the torsion spring extending between the output shaft and the driver. The first gear train includes a first drive gear supported on a drive shaft of the first actuator, a first driven gear that rotates about the rotational axis and is engaged with the first drive gear, and the driver, the driver configured to rotate together with the first driven gear. The second gear train includes a second drive gear supported on a drive shaft of the second actuator, and a second driven gear that rotates about the rotational axis and is engaged with the second drive gear. The second gear train remains idle when the first gear train is operating. The release mechanism includes the second driven gear, a housing portion of a housing of the transmission system, an elastic member that biases the second driven gear toward the housing portion, and the pin. The housing portion includes a ramp that protrudes inward from the inner surface of the housing portion, the ramp including a contact surface that is configured to contact the second driven gear upon operation of the second actuator, the ramp being inclined relative to the housing portion inner surface. The elastic member is disposed between the release mechanism and the output shaft, and the elastic member is configured to urge the release mechanism toward the retracted position. The elastic member is a conical coil spring having a first end that abuts the output shaft and a second end that abuts the second driven gear. The pin is disposed in a first pin position during the some actuation device operating conditions, and is biased toward this position by an elastic member, and during the other actuation device operating conditions, the pin is disposed in a second pin position that is axially displaced relative to the first pin position.

An electronic transmission range select actuator (ETRSA) includes, a primary gear train that operates during normal operation through all shift ranges (e.g., park, neutral, drive, reverse, etc.). The primary gear train is actuated by a first actuator, and an output shaft of the primary gear train is connected to the primary gear train via a lock pin. The lock pin is normally engaged with the output shaft, and can slide axially so as to release the output shaft from the primary gear train. The output shaft is under a rotational biasing load provided by a torsion spring, but is prevented from rotation relative to the primary gear train due to engagement by the locking pin. The ETRSA also includes release mechanism. The release mechanism is a fail-safe mechanism that includes a second actuator that operates during a power loss or failure of the first actuator. The second actuator drives a gear that is mounted on the output shaft and rotates freely relative to the output shaft. The release mechanism is configured so that rotation of the gear by the second actuator results in axial movement of the gear toward the lock pin. Axial movement of the gear causes disengagement of the lock pin from the output shaft. This allows the output shaft to rotate and return to the park range due to the biasing load of the torsion spring. Thus, the mechanism is configured to return the output shaft to the park range during a power loss or failure of the first actuator.

BRIEF DESCRIPTION OF THE. DRAWINGS

FIG. 1 is a perspective view of an ETRSA.

FIG. 2. is a schematic diagram of a vehicle including an electronic transmission system including the ETRSA of FIG. 1.

DETAILED DESCRIPTION

Figure 1:
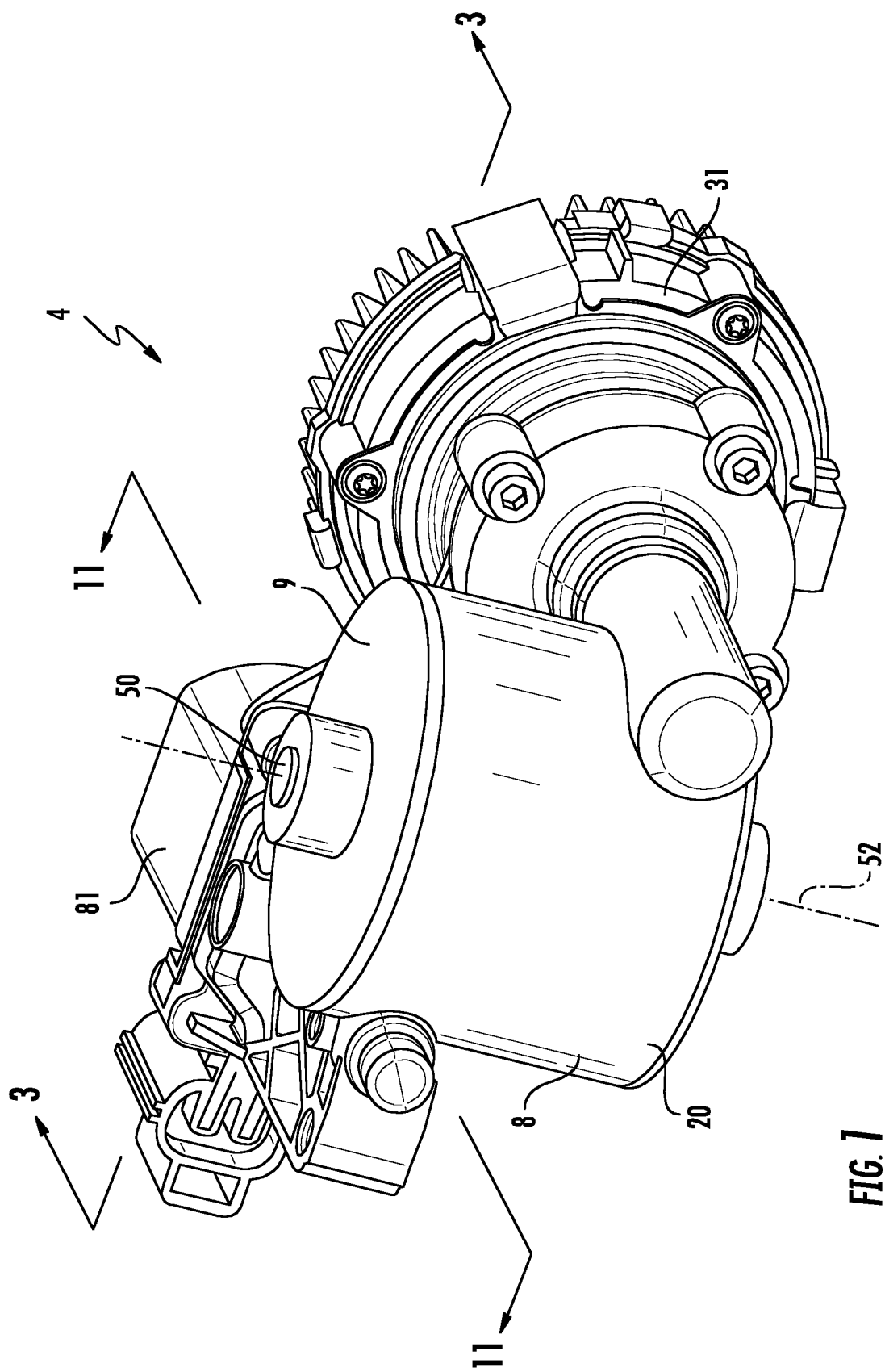
Figure 2:
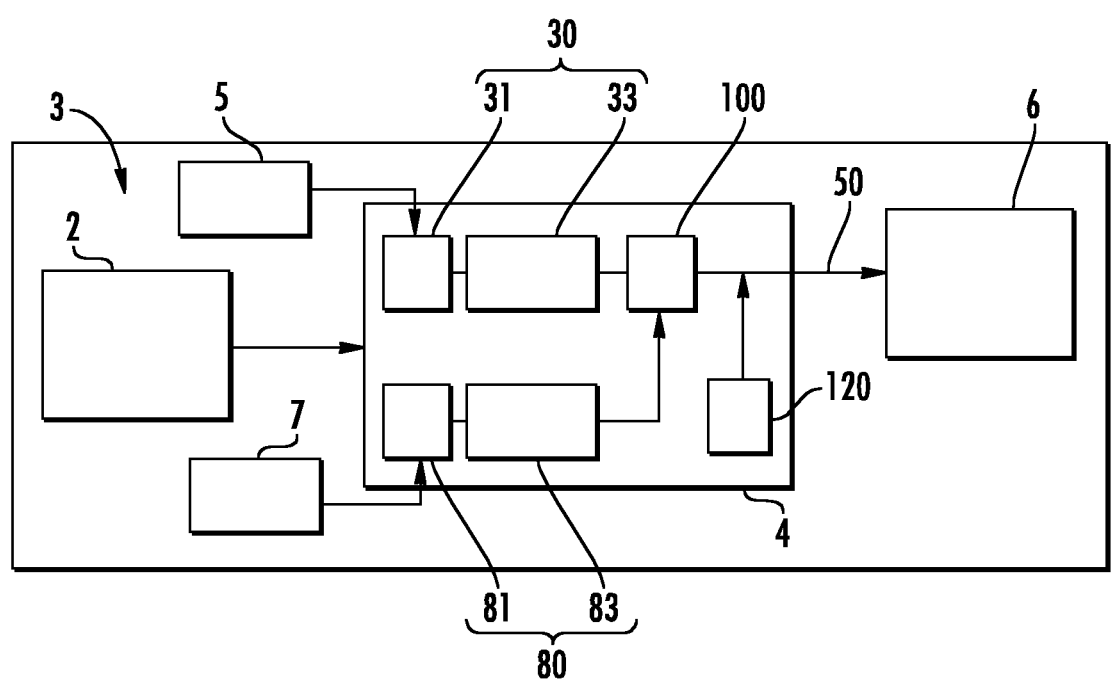

Referring to FIGS. 1 and 2, the transmission system 3 of a vehicle 1 includes an electronic transmission range selector 2 for setting a transmission range within the vehicle transmission 6, the vehicle transmission 6, and an ETRSA 4 that adjusts the gear configuration of the vehicle transmission 6 to correspond to set the transmission range as provided by the electronic transmission range selector 2. The transmission range selector 2 is remote from the vehicle transmission 6 and the ETRSA 4, and is operated by the vehicle user to select the transmission range. The transmission range selector 2 controls the transmission range via a wired connection to the ETRSA 4 that, in turn, is connected to the transmission 6 via an output shaft 50 of the ETRSA 4. Using the transmission range selector 2, the vehicle user is able to change the transmission gear range between the available gear ranges, including park, neutral, drive, reverse, etc.

The ETRSA 4 includes a primary drive system 30 that changes the range of the transmission 6 via the output shaft 50 during normal operation of the ETRSA 4. In addition, the ETRSA 4 includes a release mechanism 100 that detaches the output shaft 50 from the primary drive system 30 during abnormal operation of the ETRSA 4 allowing the return of the transmission 6 to a parking range, a secondary drive system 80 that is inactive during normal operation of the ETRSA 4 and actuates the release mechanism 100 during abnormal operation of the ETRSA 4, and a return mechanism 120 that returns the transmission 6 to the parking range during abnormal operation of the ETRSA 4. The primary and secondary drive systems 30, 80, the release mechanism 100 and the return mechanism 120 are compactly arranged within a housing 8 and are described in detail below.

Figure 3:
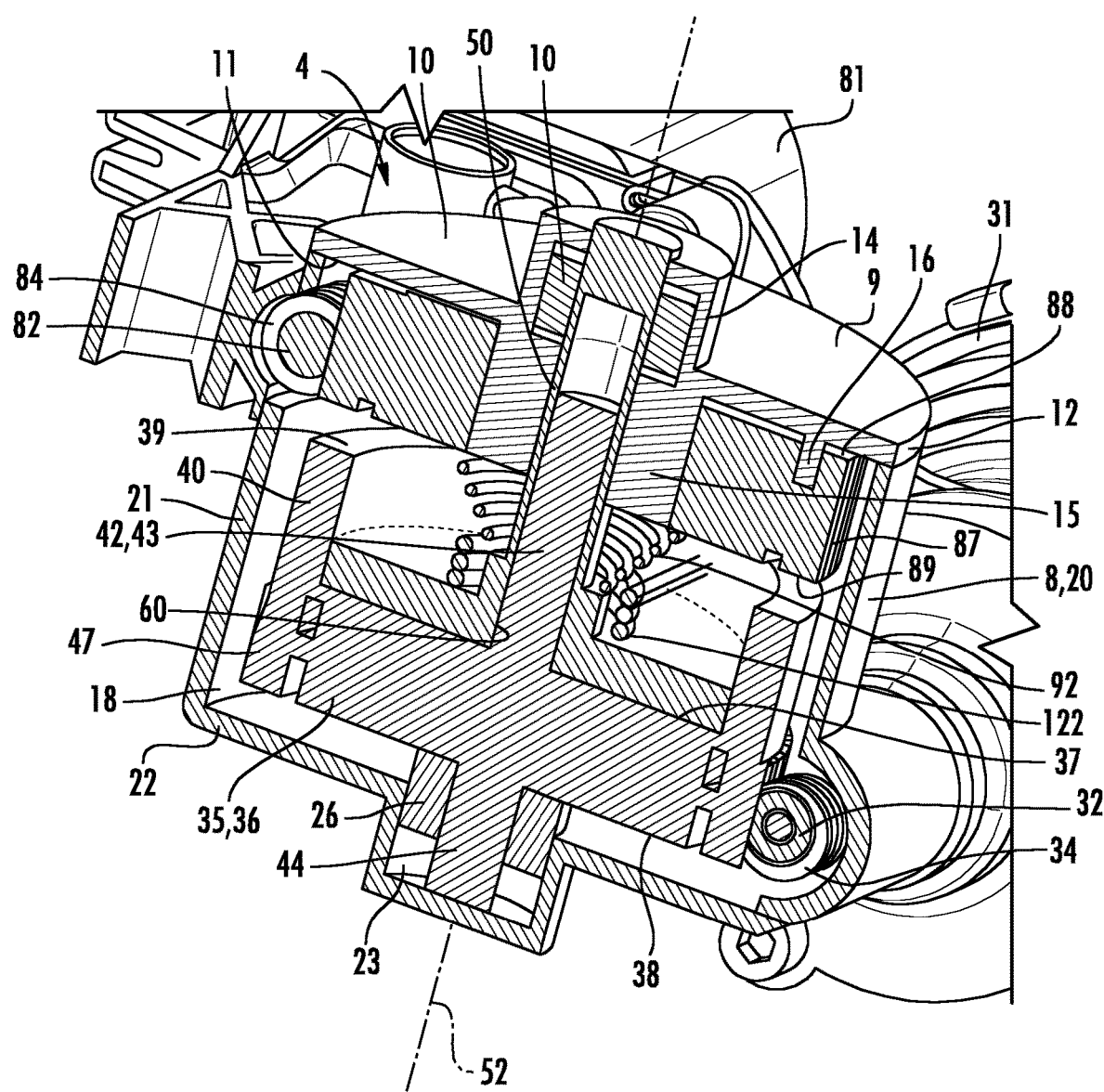
FIG. 3 is a cross-sectional view of the ETRSA of FIG. 1 as seen along line 3-3 of FIG. 1.
Figure 4:
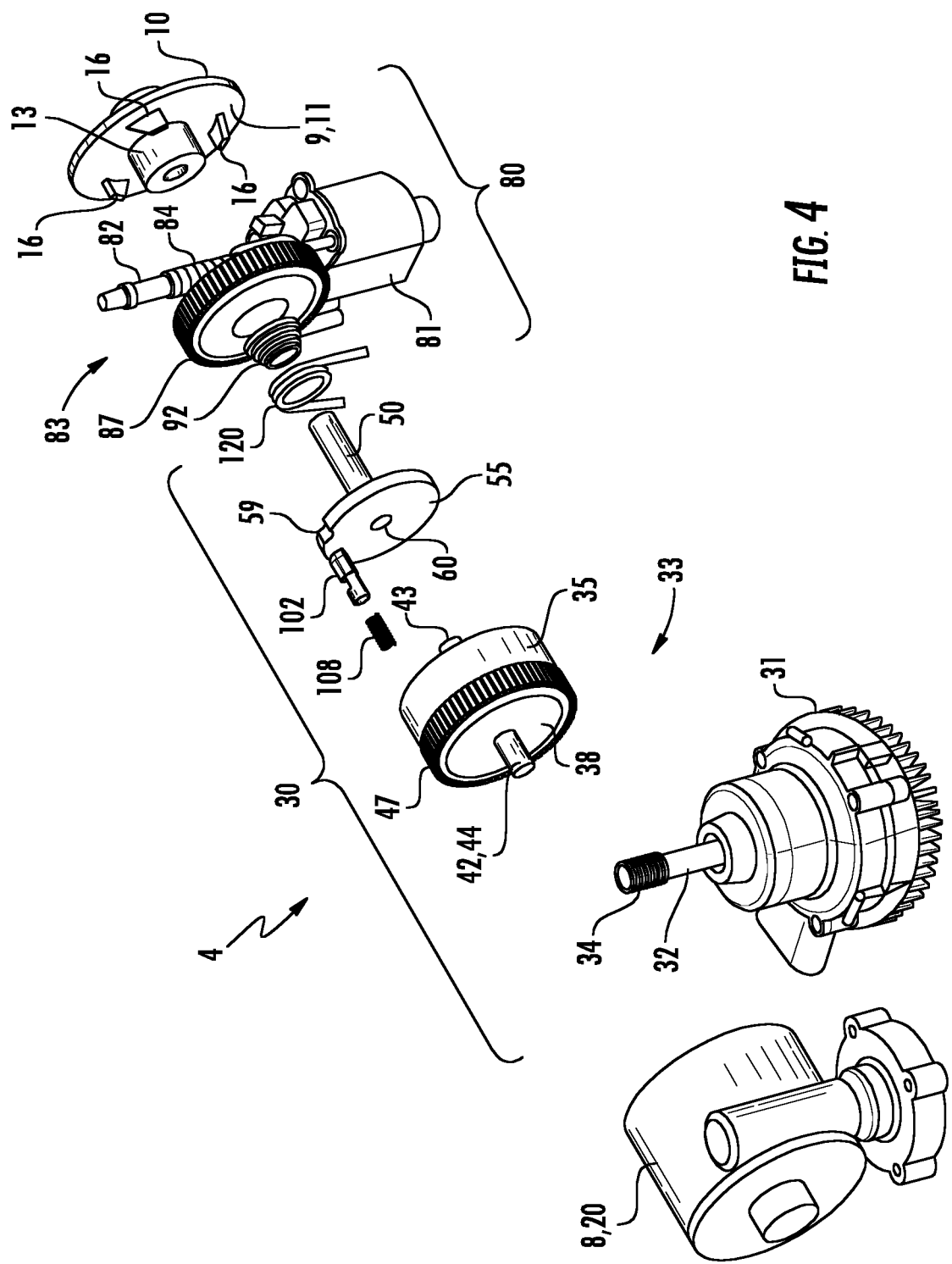
FIG. 4 is an exploded perspective view of the ETRSA.
Figure 5:
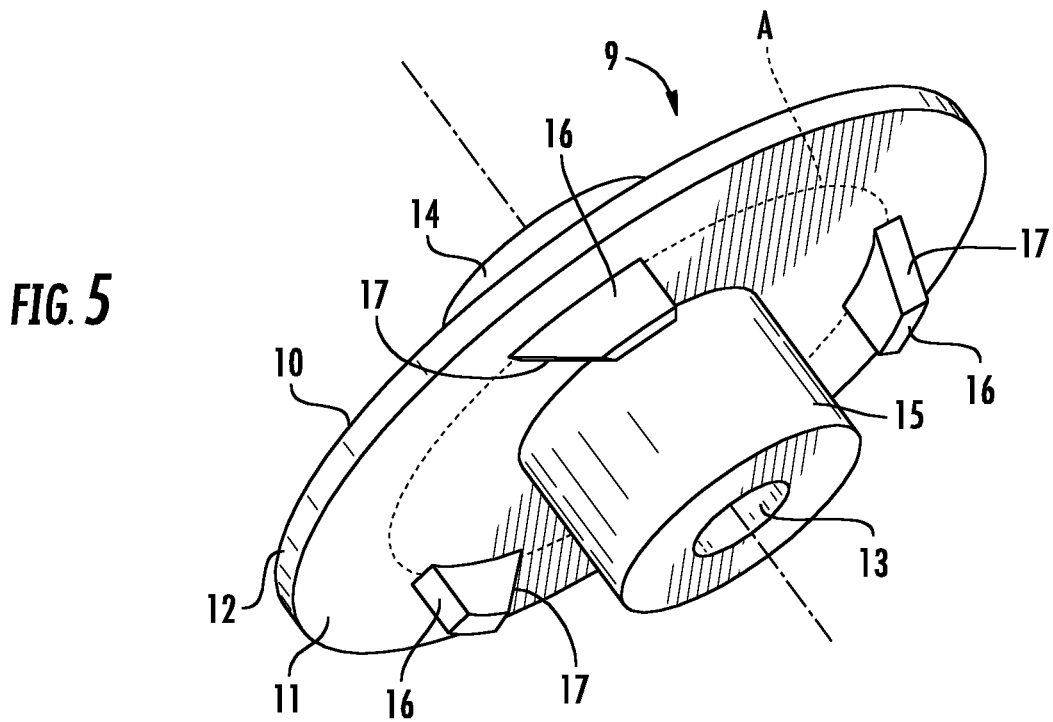
FIG. 5 is a perspective view of the ETRSA housing cover.

Referring to FIGS. 3-5, the housing 8 includes a cylindrical container portion 20 and a cover 9 that closes an open end of the container portion 20. The container portion 20 has a cylindrical housing side wall 21, and an end wall 22. The end wall 22 is disposed at one end of the housing side wall 21 and provides a closed end of the container portion 20. The end wall 21 is formed having a central recess 23 that is shaped and dimensioned to receive a rotating shaft 42 of the primary drive system 30 (described below) and a bearing 26 that rotatably supports the shaft 42 relative to the container portion end wall 22.

The cover 9 is a plate-like member having an outward-facing surface 10, an opposed, inward- or end wall-facing surface 11, and a peripheral edge 12 that joins the outward-facing surface 10 to the end wall-facing surface 11. When the cover 9 is assembled with the container portion 20, the peripheral edge 12 is flush with an outer surface of the container portion sidewall 21. The cover 9 includes a central opening 13 through which the output shaft 50 extends. The cover 9 includes a first boss 14 that surrounds the central opening 13 and protrudes axially outward from the outward-facing surface 10. An internal surface of the first boss 14 is shaped and dimensioned to receive the output shaft 50 and a bearing 25 that rotatably supports the output shaft 50 relative to the cover 9. The cover 9 includes a second boss 15 that surrounds the central opening 12 and protrudes axially inward from the end wall-facing surface 11. An internal surface of the second boss 15 is shaped and dimensioned to receive the output shaft 50 in a clearance fit. In addition, the cover 9 includes ramps 16 that protrude inward from the end wall-facing surface 11. The ramps 16 are spaced apart along an annular line A that is disposed between the second boss 15 and the cover peripheral edge 12. The ramps 16 are elongated along the annular line A. and include a contact surface 17 that faces the container portion sidewall 21. The contact surface 17 is inclined relative to the cover end wall-facing surface 11.

Together, the side wall 21, the end wall 22, and the cover 9 define a housing interior space 18 that receives the release mechanism 100, the return mechanism 120 and the gear trains 33, 83 of the primary and secondary drive systems 30, 80, as described in detail below.

Figure 6:
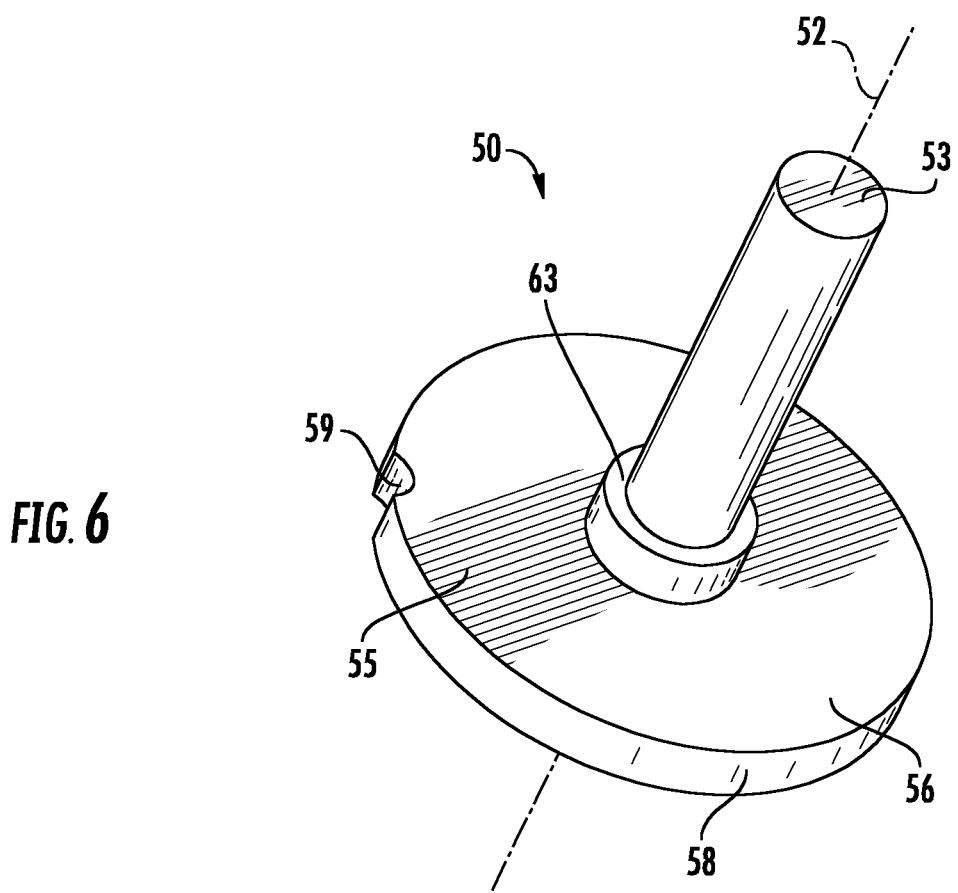
FIG. 6 is a first side perspective view of the ETRSA output shaft.
Figure 7:
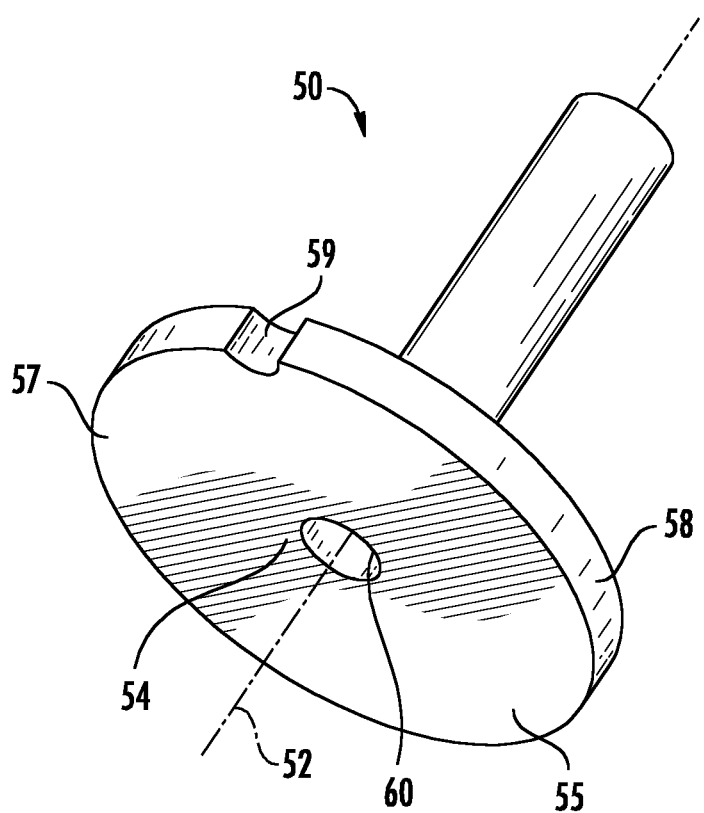
FIG. 7 is a second side perspective view of the ETRSA output shaft.

Referring to FIGS. 3, 6 and 7, the output shaft 50 is an elongate rigid rod having a first end 53, a second end 54, and a rotational axis 52 that passes through the first and second ends 53, 54. The first end 53 is received within the cover central opening 13 and is rotatably supported by the bearing 25 within the first boss 14 such that the rotational axis 52 is coaxial with a longitudinal axis of the housing container portion 20. The second end 54 includes a flange 55 that protrudes in a radial direction relative to the rotational axis 52. The flange 55 provides a cover-facing surface 56, and end wall-facing surface 57 and a peripheral edge 58 that extends between the flange cover-facing and end wall-facing surfaces 56, 57. The peripheral edge 58 is formed having an axially extending notch 59. The notch 59 has an arcuate profile when the output shaft 50 is viewed in a direction parallel to the rotational axis 52.

The output shaft second end 54 includes a blind shaft opening 60 that extends inward. The shaft opening 60 is of uniform diameter and terminates at a location adjacent the output shaft first end 53, whereby the output shaft 50 includes a cylindrical inner surface of uniform diameter.

The output shaft 50 has a non-uniform outer diameter such that the output shaft 50 has a slightly larger outer diameter adjacent to the flange cover-facing surface 56 than at the first end 53, whereby a cover-facing shoulder 62 is provided on the output shaft outer surface adjacent to the flange 55.

Referring to FIGS. 3 and 4, the primary drive system 30 includes a first actuator 31, the output shaft 50, and a first gear train 33 that connects the first actuator 31 to the output shaft 50. The first actuator 31 is a brushless, direct current (DC) electric motor that is powered by the vehicle battery 5. The first gear train 33 includes a first worm gear 34 fixed to the output shaft of the first actuator 31, which is referred to herein as the first drive shaft 32. The first drive shaft 32 is perpendicular to the output shaft 50, and the first worm gear 34 has angled, threaded external teeth that engage correspondingly threaded external teeth of a first driven gear 47 that rotates about the rotational axis 52 of the output shaft 50. The first driven gear 47 is fixed to a driver 35.

Figure 8:
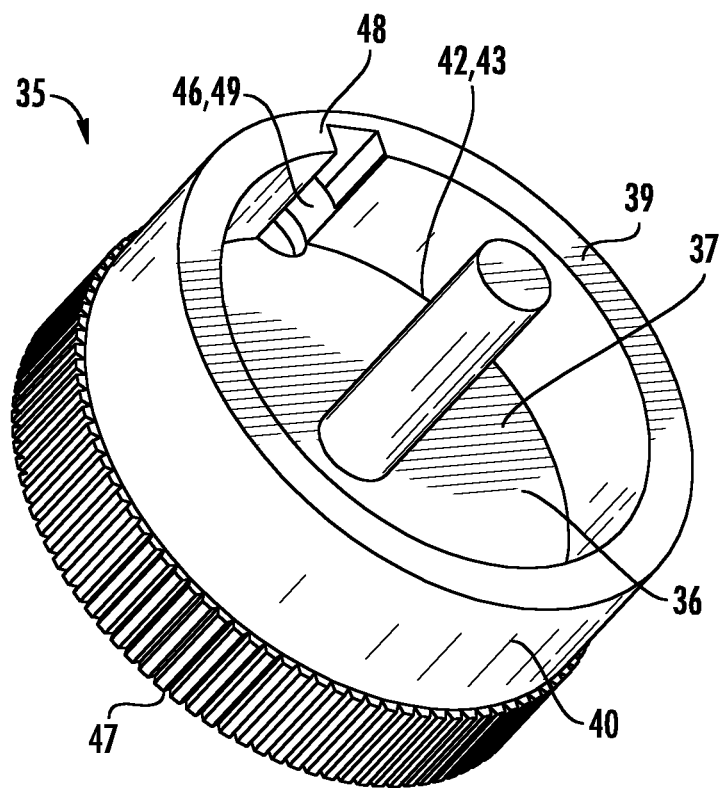
FIG. 8 is a perspective view of the driver.
Figure 9:
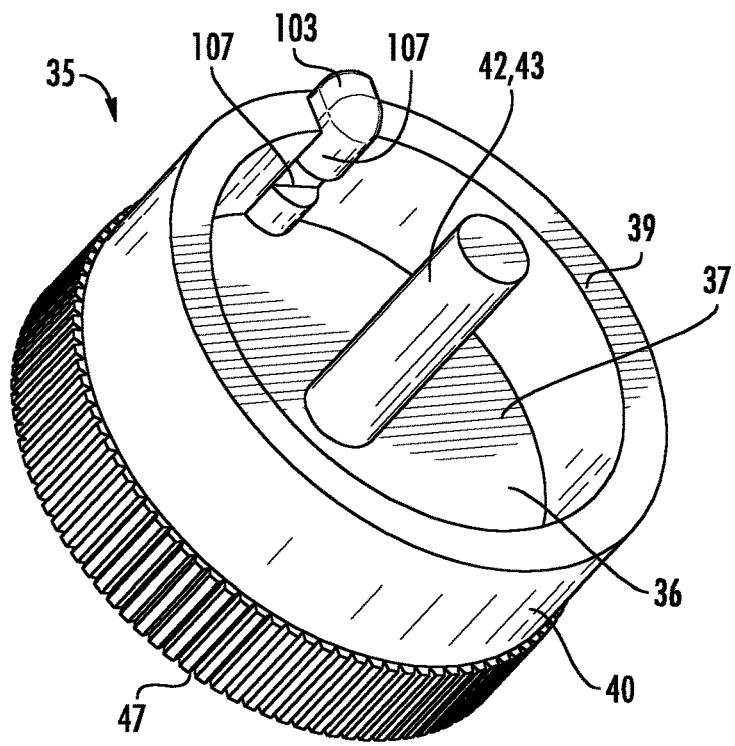
FIG. 9 is a perspective view of the driver with the pin disposed in the slot.

Referring to FIGS. 4, 8 and 9, the driver 35 is a rigid structure that includes a generally disc-shaped base 36 that is encircled by, and fixed to, the first driven gear 47. The driver 35 includes a cylindrical driver sidewall 40 that extends normally from a cover-facing surface of the first driven gear 47, and central shaft 42 that is centered on the base 36 and is coaxial with the rotational axis 52. A first portion 43 of the central shaft 42 protrudes from a cover-facing side 37 of the base 36 toward the cover 9, and is received within the blind shaft opening 60 of the output shaft 50. The central shaft first portion 43 is rotatably supported on the inner surface 61 of the shaft opening 60. In use, the end wall-facing surface 57 of the output shaft flange 55 is supported on a cover-facing surface 37 of the base 36 while the central shaft 42 resides within the shaft opening 60.

In addition, a second portion 44 of the central shaft 42 protrudes from a end wall-facing side 38 of the base 36 toward the end wall 22, and is received within the recess 23 and rotatably supported by the bearing 26.

The driver sidewall 40 includes an axial-extending slot 46 that opens at the free edge 39 of the driver sidewall 40 and terminates within the base 36 (FIG. 8). The slot 46 includes a first portion 48 that intersects the driver sidewall free edge 39, and a second portion 49 that intersects the base 36. The slot first portion 48 has a semi-rectangular cross-sectional shape, whereas the slot second portion 49 has a circular cross sectional shape. A slot shoulder 63 is formed at the transition between the slot first portion 48 and the slot second portion 49. The slot 46 is configured to receive a pin 102 (FIG. 9).

Figure 10:
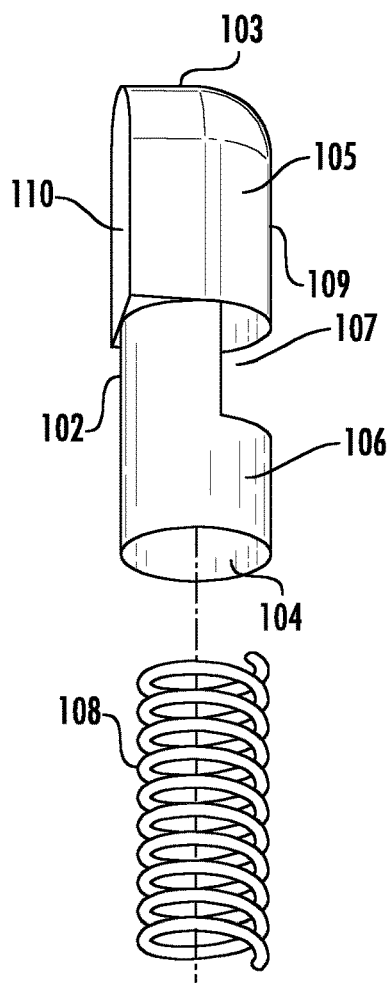
FIG. 10 is an exploded perspective view of pin and second coil spring.

Referring to FIG. 10, the pin 102 is an elongate rigid rod having a rounded first end 103 and a flat second end 104 that is opposed to the first end 103. A first portion 105 of the pin 102 that includes the first end 103 has a rectilinearly shaped cross-section. In particular, when the pin first portion 105 is viewed in cross section, a sidewall-facing surface 110 of the pin first portion 105 has three sides, and each side is orthogonal to an adjacent side. The three sides are shaped and dimensioned to correspond to the semi-rectangular shape and dimensions of the slot first portion 48. In addition, an output shaft-facing surface 109 of the pin first portion 105 has a circular cross sectional shape to correspond to the circular shape of the notch 59 formed in the peripheral edge 58 of the output shaft flange 55. A second portion 106 of the pin 102 that includes the second end 104 has a circular cross section to correspond to the circular shape and dimensions of the slot second portion 49.

The pin second portion 106 has a groove 107 that is formed in the output shaft-facing surface thereof. In addition, the groove 107 is disposed at a location between the pin first and second ends 103, 104, and more particularly within the pin second portion 106 at a location corresponding to the transition between the pin first portion 105 and the pin second portion 106. The groove 107 has an axial dimension that is at least slightly larger than the axial spacing between the flange cover-facing surface 56 and the flange end wall-facing surface 57.

The pin 102 is disposed in the slot 46 formed in the driver sidewall 40 such that the pin first portion 105 is disposed in the slot first portion 48, and the pin second portion 106 is disposed in the slot second portion 49. Because the pin first portion 105 has rectilinear features that engage with correspondingly rectilinear features of the slot first portion 48, the pin 102 is prevented from axial rotation within the slot 46. In addition, a second coil spring 108 is disposed in the slot 46 along with the pin 102. The second coil spring 108 extends between the pin second end 104 and the driver base 36. The pin 102 is configured to slide axially (e.g., in a direction parallel to the rotational axis 52) within the slot 46 between a first pin position and a second pin position, and is biased toward the cover 9 by the second coil spring 108. The first and second pin positions are described in detail below.

During normal operation of the ETRSA 4, the driver 35 is fixed to the output shaft 50 via the pin 102. In this configuration, the first gear train 32 transmits rotational output of the first drive shaft 32 to the output shaft 50.

Referring to FIGS. 2-4, the secondary drive system 80 includes a second actuator 81, the release mechanism 100, and a second gear train 83 that connects the second actuator 81 to the release mechanism 100. The second actuator 81 is a brushed DC electric motor that is powered by a secondary power source 7 such as a secondary battery or a capacitor. Thus the power source for the second actuator 81 is different from, and independent of, the power source for the first actuator 31 (e.g., the vehicle battery 5).

The second gear train 83 includes a second worm gear 84 fixed to the output shaft of the second actuator 81 and a second driven gear 87. The output shaft of the second actuator 81, referred to herein as the second drive shaft 82, is perpendicular to the output shaft 50 and parallel to the first drive shaft 32. In addition, the second drive shaft 82 and the first drive shaft 32 are on opposed sides of the output shaft 50. The second worm gear 84 has angled, threaded external teeth that engage correspondingly threaded external teeth of the second driven gear 87.

The second driven gear 87 is supported on the first boss 13 of the cover 9 in such a way that it can rotate freely about the output shaft rotational axis 52 and can also move axially along the rotational axis 52. The second driven gear 87 is biased toward the cover 9 by a first elastic member, for example a conical first coil spring 92. The first coil spring 92 extends between the shoulder 62 of the output shaft 50 and an end wall-facing surface 89 of the second driven gear 87, and urges the second driven gear 87 toward the cover 9. During normal operation of the ETRSA 4, the second driven gear 87 abuts the cover end wall facing surface 11. To this end, a cover-facing surface 88 of the second driven gear 87 includes slots 91 that are shaped, dimensioned and positioned to receive the ramps 16 that protrude inward from the cover end wall facing surface 11.

The second gear train 83 transmits the rotational output of the second drive shaft 82 to the release mechanism 100 via second driven gear 87, as discussed further below. The secondary drive system 80 is only operated during a failure or abnormal operation of the primary drive system 30. That is, during normal operation of the primary drive system 30, the secondary drive system 80 is idle.

The release mechanism 100 includes the cover 9, the second driven gear 87, the first coil spring 92, the pin 102 and the second coil spring 108. The release mechanism 100 is movable between a first, retracted position and a second, advanced position via actuation of the secondary drive system 80. During normal operation of the ETRSA 4, the secondary drive system 80 is idle, and the release mechanism 100 remains in the retracted position.

Figure 11:
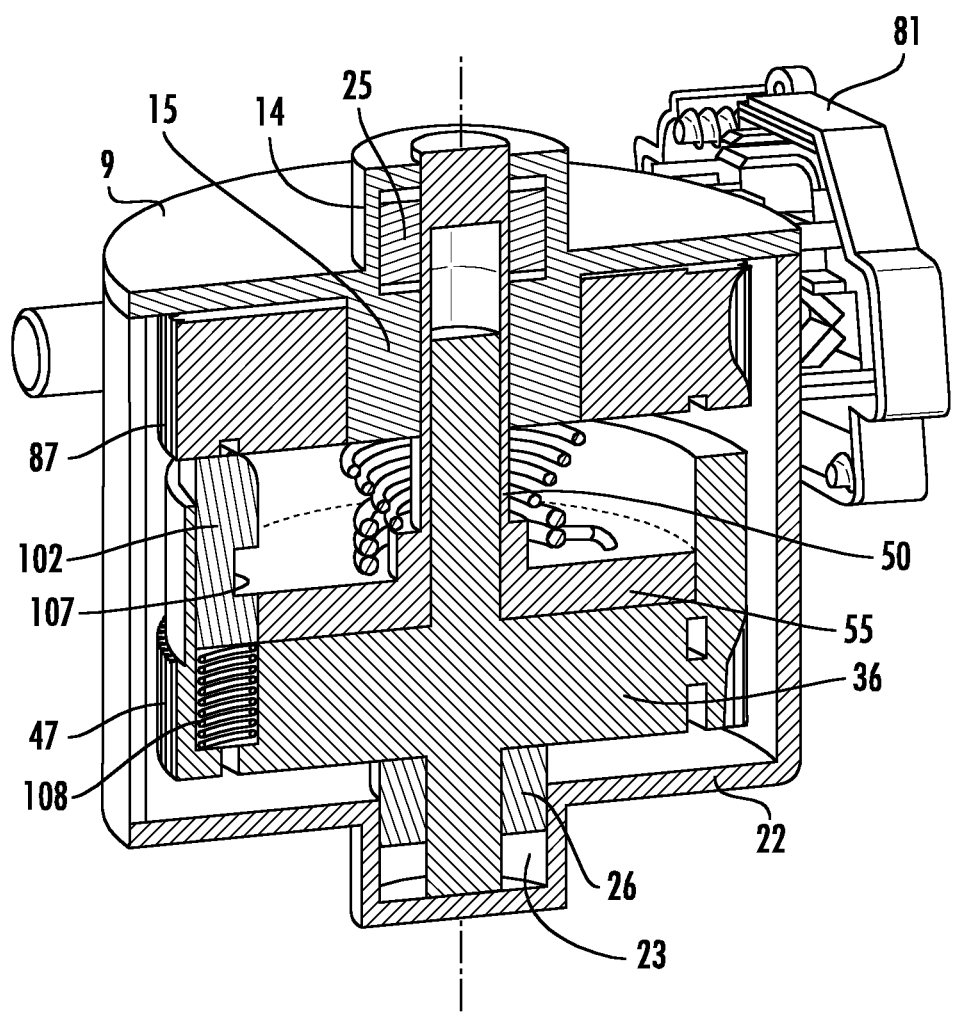
FIG. 11 is a cross-sectional view of the ETRSA of FIG. 1 as seen along line 11-11 of FIG. 1, illustrating the release mechanism in the retracted position and the pin in the first pin position.

Referring to FIG. 11, in the retracted position, the second driven gear 87 abuts the cover end wall-facing surface 11 and the ramps 16 that protrude inwardly from the cover 9 are disposed in the slots 91 provided on the cover-facing surface 88 of the second driven gear 87. In particular, the second driven gear 87 is urged against the cover 9 by the first coil spring 92. In addition, the pin 102 is disposed in the slot 46 in the first pin position.

In the first pin position, the pin 102 resides within the slot 46 such that the pin first end 103 resides outside the slot 46 so as to be spaced apart from the driver sidewall fee edge 39. In particular, the second coil spring 108 biases the pin 102 toward the second driven gear 87 such that the pin first end 103 abuts the driven gear end wall-facing surface 89. In this position, the circular output shaft-facing surface 109 of the pin first portion 105 is disposed in the notch 59 of the output shaft flange 55. As a result, the pin 102 fixes the output shaft 50 relative to the driver 35. This arrangement allows the output shaft 50 to be driven by the primary drive system 30.

Figure 12:
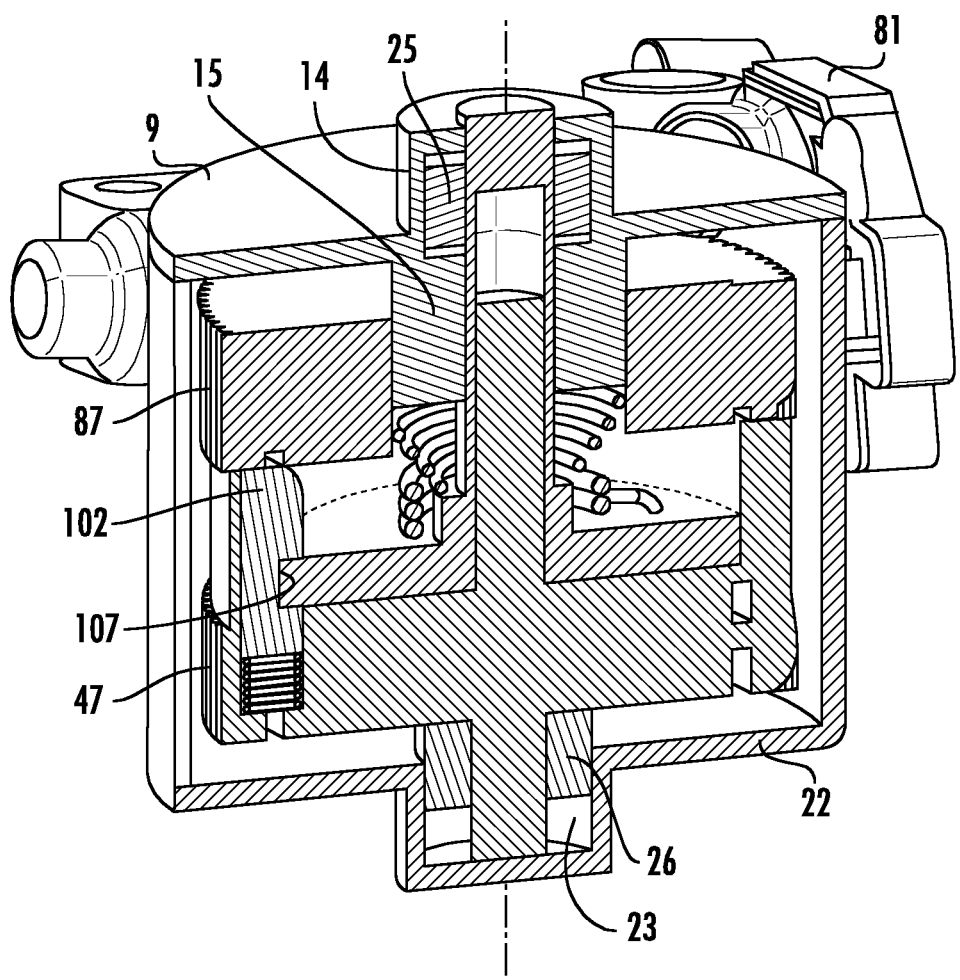
FIG. 12 is a cross-sectional view of the ETRSA of FIG. 1 as seen along line 11-11 of FIG. 1, illustrating the release mechanism in the advanced position and the pin in the second pin position.

Referring to FIG. 12, abnormal operation of the primary drive system may occur, for example, when there is a malfunction of the first actuator 31 or a failure of the first power source 5. In some embodiments, the abnormal operation of the first drive system 30 is detected by a electronic control unit (ECU, not shown). The ECU may be dedicated to the vehicle transmission system or may control operation of several vehicle functions. Upon detection of the abnormal operation of the primary drive system 30, the ECU controls the secondary drive system 80 to return the transmission 6 to the parking range as follows:

During abnormal operation of the ETRSA 4, the release mechanism 100 is moved to the advanced position via actuation of the secondary drive system 80. In particular, the second actuator 82 is operated and the second worm gear 84 drives the second driven gear 87 to rotate about the rotational axis 52 relative to the cover 9. As the second driven gear 87 rotates, the inclined contact surfaces 17 of the ramps 16 engage an edge of the corresponding slot 91 of the second driven gear 87 and serve as a wedge between the cover 9 and the second driven gear 87. Since the cover 9 is fixed, the second driven gear 87 is axially displaced by the relative movement between the inclined surfaces 17 of the ramps 16 and slots 91 of the second driven gear 87. That is, the rotation of the second driven gear 87 results in displacement of the second driven gear 87 in a direction toward the container portion end wall 22. In addition, the axial movement of the second driven gear 87 results in axial movement of the pin 102 against the biasing force of the second coil spring 108, toward the driver base 36 and to the second pin position.

In the second pin position, the pin first end 103 is flush with the driver sidewall fee edge 39. When the pin 102 is in this position, the groove 107 is axially aligned with the flange 55, whereby the pin 102 no longer resides in the notch 59 and thus the driver 35 is disengaged from the flange 55. As a result, the output shaft 50 is free to rotate relative to the driver 35.

Thus, movement of the release mechanism 100 to the advanced position results in disengagement of the output shaft 50 from the primary drive system 30.

A third elastic element, for example a torsion spring 122 is disposed in the container portion 20 and surrounds widened portion of the output shaft 50. The torsion spring 122 serves as a return mechanism 120, and is connected at one end to an inner surface of the driver sidewall 40 and at an opposed end to the flange 55. The torsion spring 122 is arranged so that when the torsion spring 122 is in a resting (e.g., unloaded state), the output shaft 50 is in a position corresponding to the parking range.

During normal operation of the ETRSA 4, the primary drive system 30 operates against the biasing force of the torsion spring 122 to rotate the output shaft 50 about the rotational axis 52 between the parking range and other available ranges based on the setting of the electronic transmission range selector 2. Although the output shaft 50 is under a biasing load provided by the torsion spring 122, the output shaft 50 is prevented from rotation relative to the driver 35 due to engagement of the pin 120.

However, when the ETRSA 4 operates abnormally, the output shaft 50 is disengaged from the primary drive system 30 via the release mechanism 100, as described above. When the output shaft 50 is released from the primary drive system 30, the biasing force of the torsion spring 122 rotates the output shaft 50 to a position corresponding to the parking range.

When the primary drive system 30 is subsequently returned to normal operation, the secondary drive system 80 is used to return the release mechanism 100 to the retracted position, with assistance from the first coil spring 92. This may include reversing the second actuator 81 to rotate the second driven gear to an orientation in which the slots 91 of the second driven gear 87 are axially aligned with the ramps 16. In this position, the second driven gear is urged against the cover 9 by the biasing force of the first coil spring 92, and the pin 102 is returned to the first pin position by the biasing force of the second coil spring 108.

Since the second drive system 80 is powered independently of the first drive system 30, the ETRSA 4 provides robust and reliable fail-safe actuation of the vehicle transmission 6.

In the illustrated embodiment, the first actuator 31 is a brushless DC electric motor that is powered by the vehicle battery 5. It is understood, however, that the first actuator 31 is not limited to being powered by this type of electric motor, and that other types of electric motors or other motive sources can be used to drive the first gear train, and the specific motive source used is determined by the requirements of the specific application. In addition, the first actuator 31 is not limited to being powered by the vehicle battery, and the vehicle battery may be replaced by another appropriate power source.

In the illustrated embodiment, the second actuator 81 is a brushed DC electric motor that is powered by the secondary power source 7. It is understood, however, that the second actuator 81 is not limited to being powered by this type of electric motor, that other types of electric motors or other motive sources can be used to drive the second gear train, and the specific motive source used is determined by the requirements of the specific application.

Selective illustrative embodiments of the actuator are described above in some detail. It should be understood that only structures considered necessary for clarifying the actuator have been described herein. Other conventional structures, and those of ancillary and auxiliary components of the actuator, are assumed to be known and understood by those skilled in the art. Moreover, while a working example of the actuator has been described above, the actuator is not limited to the working example described above, but various design alterations may be carried out without departing from the actuator as set forth in the claims.

What is claimed is:

1. An actuation device comprising
an output shaft that is rotatable about a rotational axis;
a first gear train that connects a first actuator to the output shaft and transmits rotational output of the first actuator to the output shaft, the first gear train including a driver that is driven by the first actuator to rotate about the rotational axis and is configured to be fixed relative to the output shaft via a pin; and
a second gear train that connects a second actuator to a release mechanism and transmits rotational output of the second actuator to the release mechanism,
wherein
the release mechanism is moveable between a retracted position in which the pin is engaged with the output shaft such that the output shaft is fixed relative to the driver, and an advanced position in which the pin is translated in a direction parallel to the rotational axis to an extent that the pin is disengaged from the output shaft and the output shaft is permitted to rotate relative to the driver,
in some actuation device operating conditions, the output shaft is driven by the first actuator to rotate via the first gear train, and
in other actuation device operating conditions, the release mechanism is driven by the second actuator to move from the retracted position to the advanced position, whereby the output shaft is disengaged from the first gear train.

2. The actuation device of claim 1, wherein during the other actuation device operating conditions, the output shaft is urged to return to a predetermined rotational position under the biasing force of an elastic member.

3. The actuation device of claim 2, wherein the elastic element is a torsion spring, the torsion spring extending between the output shaft and the driver.

4. The actuation device of claim 1, wherein the first gear train includes a first drive gear supported on a drive shaft of the first actuator, a first driven gear that rotates about the rotational axis and is engaged with the first drive gear, and the driver, the driver configured to rotate together with the first driven gear.

5. The actuation device of claim 1, wherein the second gear train includes a second drive gear supported on a drive shaft of the second actuator, and a second driven gear that rotates about the rotational axis and is engaged with the second drive gear.

6. The actuation device of claim 5 wherein the second gear train remains idle when the first gear train is operating.

7. The actuation device of claim 5, wherein
the release mechanism includes the second driven gear, a housing portion of a housing of the transmission system, an elastic member that biases the second driven gear toward the housing portion, and the pin, and
wherein
the housing portion includes
a ramp that protrudes inward from the inner surface of the housing portion, the ramp including a contact surface that is configured to contact the second driven gear upon operation of the second actuator, the ramp being inclined relative to the housing portion inner surface.

8. The actuation device of claim 7, wherein the elastic member is disposed between the release mechanism and the output shaft. and the elastic member is configured to urge the release mechanism toward the retracted position.

9. The actuation device of claim 8, wherein the elastic member is a conical coil spring having a first end that abuts the output shaft and a second end that abuts the second driven gear.

10. The actuation device of claim 1, wherein
the pin is disposed in a first pin position during the some actuation device operating conditions, and is biased toward this position by an elastic member, and
during the other actuation device operating conditions, the pin is disposed in a second pin position that is axially displaced relative to the first pin position.

11. A transmission system comprising
a vehicle transmission,
an electronic transmission range selector that indicates a desired transmission range of the vehicle transmission, and
an actuation device that adjusts the configuration of the vehicle transmission to correspond to the transmission range as indicated by the electronic transmission range selector, the actuation device including
an output shaft that is rotatable about a rotational axis;
a first gear train that connects a first actuator to the output shaft and transmits rotational output of the first actuator to the output shaft, the first gear train including a driver that is driven by the first actuator to rotate about the rotational axis and is configured to be fixed relative to the output shaft via a pin; and
a second year train that connects a second actuator to a release mechanism and transmits rotational output of the second actuator to the release mechanism,
wherein
the release mechanism is moveable between a retracted position in which the pin is engaged with the output shaft such that the output shaft is fixed relative to the driver, and an advanced position in which the pin is translated in a direction parallel to the rotational axis to an extent that the pin is disengaged from the output shaft and the output shaft is pelt tined to rotate relative to the driver,
in some operating conditions of the transmission system, the output shaft is driven by the first actuator to rotate via the first gear train, and
in other operating conditions of the transmission system, the release mechanism is driven by the second actuator to move from the retracted position to the advanced position, whereby the output shaft is disengaged from the first gear train.

12. The transmission system of claim 11, wherein during the other operating conditions of the transmission system, the output shaft is urged to return to a predetermined rotational position under the biasing force of an elastic member.

13. The transmission system of claim 12, wherein the elastic element is a torsion spring, the torsion spring extending between the output shaft and the driver.

14. The transmission system of claim 11, wherein the first gear train includes a first drive gear supported on a drive shaft of the first actuator, a first driven gear that rotates about the rotational axis and is engaged with the first drive gear, and the driver, the driver configured to rotate together with the first driven gear.

15. The transmission system of claim 11, wherein the second gear train includes a second drive gear supported on a drive shaft of the second actuator, and a second driven gear that rotates about the rotational axis and is engaged with the second drive gear.

16. The transmission system of claim 15 wherein the second gear train remains idle when the first gear train is operating.

17. The transmission system of claim 15, wherein
the release mechanism includes the second driven gear, a housing portion of a housing of the transmission system, an elastic member that biases the second driven gear toward the housing portion, and the pin, and wherein
the housing portion includes
a ramp that protrudes inward from the inner surface of the housing portion, the ramp including a contact surface that is configured to contact the second driven gear upon operation of the second actuator, the ramp being inclined relative to the housing portion inner surface.

18. The transmission system of claim 17, wherein the elastic member is disposed between the release mechanism and the output shaft, and the elastic member is configured to urge the release mechanism toward the retracted position.

19. The transmission system of claim 18, wherein the elastic member is a conical coil spring having a first end that abuts the output shaft and a second end that abuts the second driven gear.

20. The transmission system of claim 11, wherein
the pin is disposed in a first pin position during the some operating conditions of the transmission system, and is biased toward this position by an elastic member, and during the other operating conditions of the transmission system, the pin is disposed in a second pin position that is axially displaced relative to the first pin position.

21. An actuation device comprising an output shaft that is rotatable about a rotational axis;
a first gear train that connects a first actuator to the output shaft and transmits rotational output of the first actuator to the output shaft, the first gear train including a driver that is driven by the first actuator to rotate about the rotational axis and is configured to be fixed relative to the output shaft via a pin; and
a second gear train that connects a second actuator to a release mechanism and transmits rotational output of the second actuator to the release mechanism,
wherein
the release mechanism is moveable between a retracted position in which the pin is engaged with the output shaft such that the output shaft is fixed relative to the driver, and an advanced position in which the pin is disengaged from the output shaft and the output shaft is permitted to rotate relative to the driver,
in some actuation device operating conditions, the output shaft is driven by the first actuator to rotate via the first gear train,
in other actuation device operating conditions, the release mechanism is driven by the second actuator to move from the retracted position to the advanced position, whereby the output shaft is disengaged from the first gear train, and
the second gear train includes a second drive gear supported on a drive shaft of the second actuator, and a second driven gear that rotates about the rotational axis and is engaged with the second drive gear.

* * * * *

UNITED STATES PATENT AND TRADEMARK OFFICE
CERTIFICATE OF CORRECTION

PATENT NO. : 10,605,360 B2
APPLICATION NO. : 15/440344
DATED : March 31, 2020
INVENTOR(S) : Raul Nava Gonzalez Page 1 of 1

It is certified that error appears in the above-identified patent and that said Letters Patent is hereby corrected as shown below:

In the Claims

In Claim 11, at Column 10, Line 47, delete the text "pelt tined" between the words "is" and "to" and replace with "permitted".

Signed and Sealed this
Ninth Day of June, 2020

Andrei Iancu
*Director of the United States Patent and Trademark Office*